(12) United States Patent
Park et al.

(10) Patent No.: US 8,548,081 B2
(45) Date of Patent: Oct. 1, 2013

(54) METHODS AND APPARATUS FOR DIVERSITY COMBINING OF REPEATED SIGNALS IN OFDMA SYSTEMS

(75) Inventors: Jong Hyeon Park, San Jose, CA (US); Bok Tae Sim, San Ramon, CA (US); Je Woo Kim, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 845 days.

(21) Appl. No.: 12/034,420

(22) Filed: Feb. 20, 2008

(65) Prior Publication Data

US 2009/0238063 A1    Sep. 24, 2009

(51) Int. Cl.
*H04B 7/02*    (2006.01)
(52) U.S. Cl.
USPC ........... 375/267; 375/260; 375/262; 375/347; 370/203; 370/208; 370/210; 370/252; 370/328
(58) Field of Classification Search
USPC ................ 375/260, 267, 346; 370/208, 210, 370/328–330
See application file for complete search history.

(56) References Cited

U.S. PATENT DOCUMENTS

| | | | | |
|---|---|---|---|---|
| 5,884,192 A * | 3/1999 | Karlsson et al. | ........... | 455/562.1 |
| 7,386,781 B2 | 6/2008 | Persson et al. | | |
| 2004/0116077 A1 | 6/2004 | Lee et al. | | |
| 2007/0071150 A1* | 3/2007 | Yang et al. | ........... | 375/347 |
| 2008/0025427 A1* | 1/2008 | Lee et al. | ........... | 375/262 |
| 2008/0037670 A1* | 2/2008 | Lee et al. | ........... | 375/260 |
| 2009/0158109 A1* | 6/2009 | Park et al. | ........... | 714/748 |
| 2009/0158110 A1* | 6/2009 | Park et al. | ........... | 714/748 |

FOREIGN PATENT DOCUMENTS

| | | |
|---|---|---|
| JP | 2004088767 A | 3/2004 |
| JP | EP1845646 * | 10/2007 |
| RU | 2280929 C1 | 7/2006 |
| SU | 1083378 A1 | 3/1984 |
| TW | 512602 B | 12/2002 |
| TW | 548927 | 8/2003 |
| TW | I223517 | 11/2004 |
| WO | WO03058871 A1 | 7/2003 |

OTHER PUBLICATIONS

International Search Report—PCT/US08/067411, International Search Authority—European Patent Office—(Dec. 8, 2008).
Written Opinion—PCT/US08/067411, International Search Authority—European Patent Office—(Dec. 8, 2008).
Taiwan Search Report—TW097124612—TIPO—Nov. 8, 2011.
Taiwan Search Report—TW097124612—TIPO—May 5, 2012.
Taiwan Search Report—TW097124612—TIPO—Nov. 7, 2012.

* cited by examiner

*Primary Examiner* — Daniel Washburn
*Assistant Examiner* — Eboni Hughes
(74) *Attorney, Agent, or Firm* — Tyler J. Overall (57) ABSTRACT

In accordance with a method for diversity combining in an orthogonal frequency division multiple access (OFDMA) system, repetition diversity equalization and combining may be performed with respect to received OFDMA signals. In addition, receiver antenna diversity equalization and combining may be performed with respect to the received OFDMA signals. The repetition diversity equalization and combining and the receiver antenna diversity equalization and combining may be performed in accordance with a maximum ratio combining (MRC) scheme.

24 Claims, 10 Drawing Sheets

METHODS AND APPARATUS FOR DIVERSITY COMBINING OF REPEATED SIGNALS IN OFDMA SYSTEMS

TECHNICAL FIELD

The present disclosure relates generally to wireless communication systems. More specifically, the present disclosure relates to methods and apparatus for diversity combining of repeated signals in orthogonal frequency division multiple access (OFDMA) systems.

BACKGROUND

Wireless communication devices have become smaller and more powerful in order to meet consumer needs and to improve portability and convenience. Consumers have become dependent upon wireless communication devices such as cellular telephones, personal digital assistants (PDAs), laptop computers, and the like. Consumers have come to expect reliable service, expanded areas of coverage, and increased functionality. Wireless communication devices may be referred to as mobile stations, stations, access terminals, user terminals, terminals, subscriber units, user equipment, etc.

A wireless communication system may simultaneously support communication for multiple wireless communication devices. A wireless communication device may communicate with one or more base stations (which may alternatively be referred to as access points, Node Bs, etc.) via transmissions on the uplink and the downlink. The uplink (or reverse link) refers to the communication link from the wireless communication devices to the base stations, and the downlink (or forward link) refers to the communication link from the base stations to the wireless communication devices.

Wireless communication systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

As indicated above, the present disclosure relates generally to wireless communication systems. More specifically, the present disclosure relates to methods and apparatus for diversity combining of repeated signals in orthogonal frequency division multiple access (OFDMA) systems.

SUMMARY

A method for diversity combining in an orthogonal frequency division multiple access (OFDMA) system is disclosed. The method may include performing repetition diversity equalization and combining with respect to received OFDMA signals. The method may also include performing receiver antenna diversity equalization and combining with respect to the received OFDMA signals. The repetition diversity equalization and combining and the receiver antenna diversity equalization and combining may be performed in accordance with a maximum ratio combining scheme.

A wireless device for diversity combining in an OFDMA system is also disclosed. The wireless device may include a repetition diversity equalizer and combiner that is configured to perform repetition diversity equalization and combining with respect to received OFDMA signals. The wireless device may also include a receiver antenna diversity equalizer and combiner that is configured to perform receiver antenna diversity equalization and combining with respect to the received OFDMA signals. The repetition diversity equalization and combining and the receiver antenna diversity equalization and combining may be performed in accordance with a maximum ratio combining scheme.

An apparatus for diversity combining in an OFDMA system is also disclosed. The apparatus may include means for performing repetition diversity equalization and combining with respect to received OFDMA signals. The apparatus may also include means for performing receiver antenna diversity equalization and combining with respect to the received OFDMA signals. The repetition diversity equalization and combining and the receiver antenna diversity equalization and combining may be performed in accordance with a maximum ratio combining scheme.

A computer-program product for diversity combining in an OFDMA system is also disclosed. The computer-program product may include code for performing repetition diversity equalization and combining with respect to received OFDMA signals. The computer-program product may also include code for performing receiver antenna diversity equalization and combining with respect to the received OFDMA signals. The repetition diversity equalization and combining and the receiver antenna diversity equalization and combining may be performed in accordance with a maximum ratio combining scheme.

DETAILED DESCRIPTION

Figure 1:
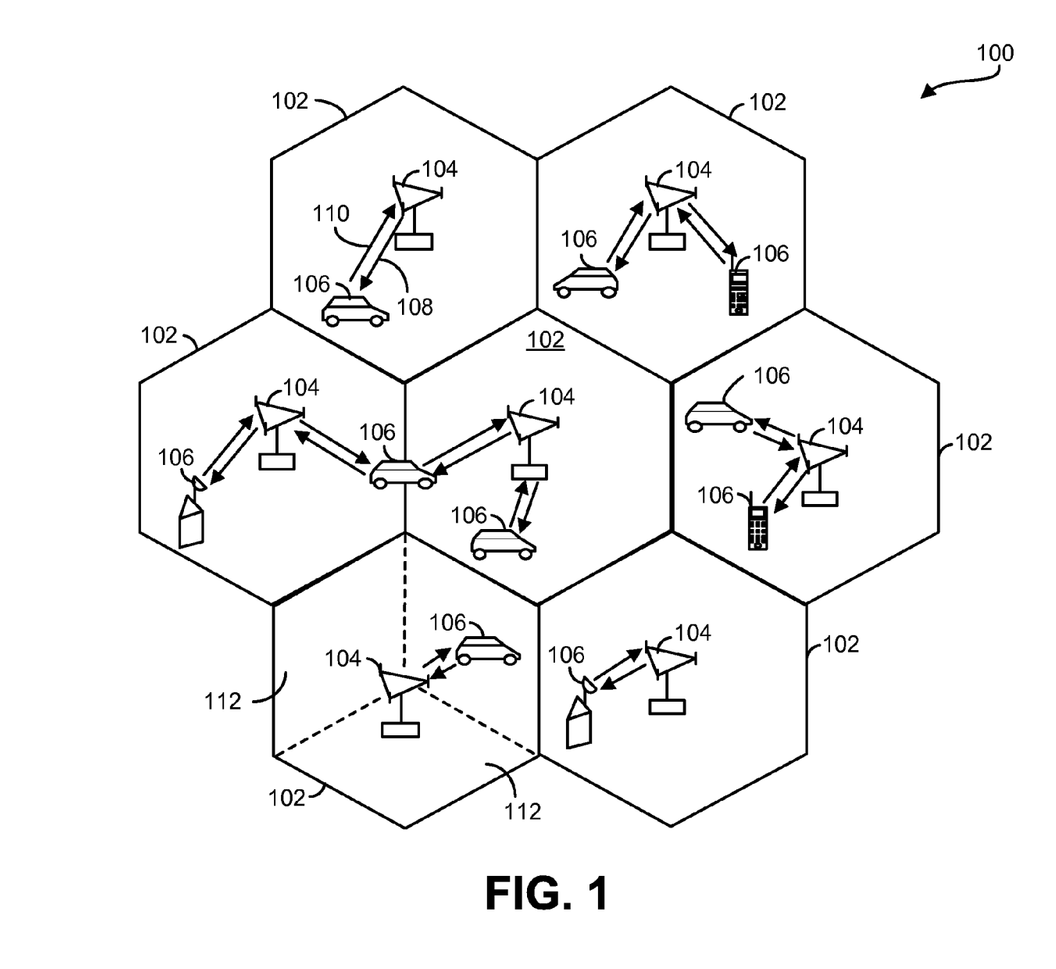
FIG. 1 illustrates an example of a wireless communication system.

FIG. 1 illustrates an example of a wireless communication system 100. The wireless communication system 100 may be a broadband wireless communication system 100. The wireless communication system 100 provides communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 shows various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within the wireless communication system 100 may utilize antennas that concentrate the flow of power within a particular sector 112 of the cell 102. Such antennas may be referred to as directional antennas.

The methods and apparatus of the present disclosure may be utilized in a broadband wireless communication system. The term "broadband wireless" refers to technology that provides wireless, voice, Internet, and/or data network access over a given area.

WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses. Mobile WiMAX offers the full mobility of cellular networks at broadband speeds.

Mobile WiMAX is based on OFDM (orthogonal frequency division multiplexing) and OFDMA (orthogonal frequency division multiple access) technology. OFDM is a digital multi-carrier modulation technique that has recently found wide adoption in a variety of high-data-rate communication systems. With OFDM, a transmit bit stream is divided into multiple lower-rate sub-streams. Each sub-stream is modulated with one of multiple orthogonal sub-carriers and sent over one of a plurality of parallel sub-channels. OFDMA is a multiple access technique based on OFDM. With OFDMA, users may be assigned sub-carriers in different time slots. OFDMA is a flexible multiple-access technique that can accommodate many users with widely varying applications, data rates, and quality of service requirements.

The rapid growth in wireless internets and communications has led to an increasing demand for high data rate in the field of wireless communications services. OFDMA systems are today regarded as one of the most promising research areas and as a key technology for the next generation of wireless communications. This is due to the fact that OFDMA modulation schemes can provide many advantages like modulation efficiency, spectrum efficiency, flexibility, and strong multipath immunity over conventional single carrier modulation schemes.

IEEE 802.16 is an emerging standard organization to define an air interface for fixed and mobile broadband wireless access (BWA) systems. IEEE 802.16 approved '16d in May 2004 for fixed BWA systems and published '16e in October 2005 for mobile BWA systems. Those two standards defined four different physical layers (PHYs) and one medium access control (MAC) layer. The OFDM physical layer and the OFDMA physical layer of the four physical layers are the most popular in the fixed and mobile BWA areas respectively.

Figure 2:
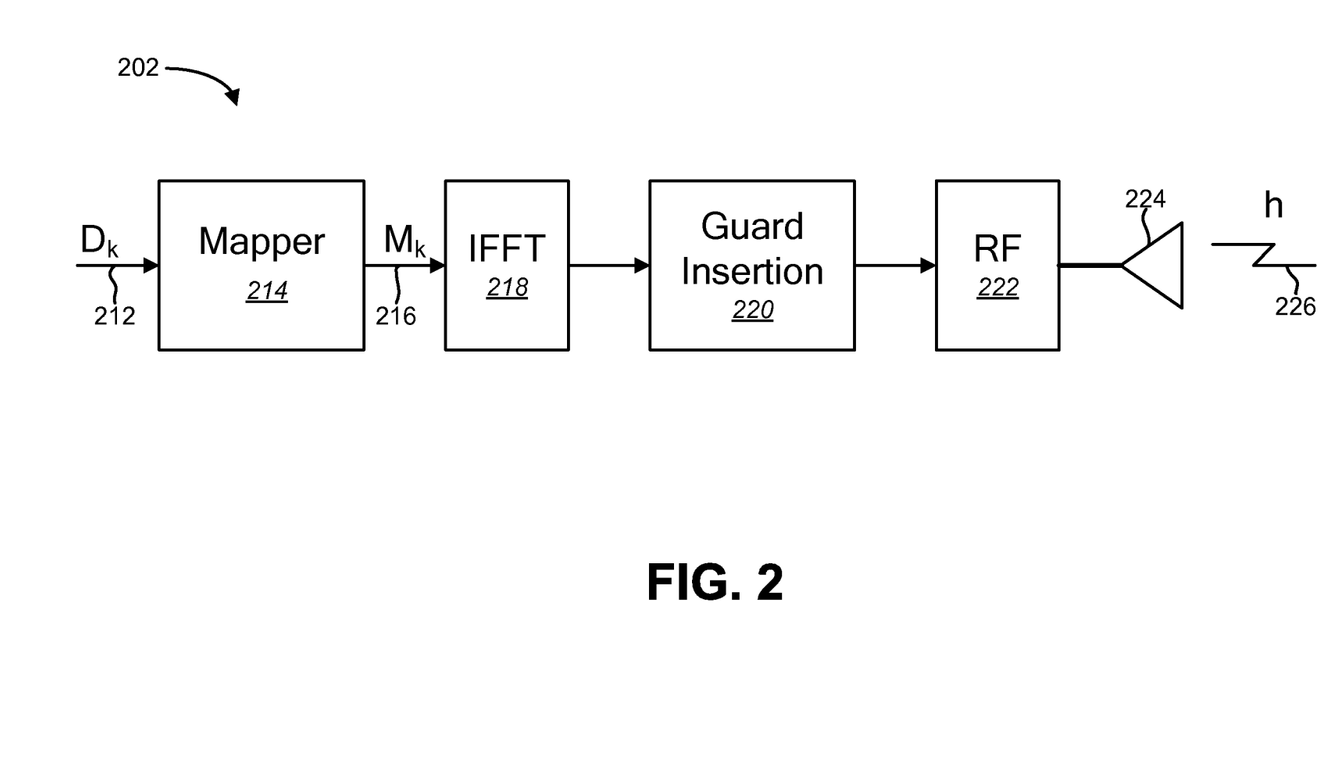
FIG. 2 illustrates an example of a transmitter for an OFDMA system.

FIG. 2 illustrates an example of a transmitter 202 for an OFDMA system. Transmission data $D_k$ 212 is shown being fed into a mapper 214. The mapper 214 may perform mapping and modulation, and may output a mapped/modulated signal $M_k$ 216. The mapped/modulated signal $M_k$ 216 is shown being processed by an inverse fast Fourier transform (IFFT) component 218, a guard insertion component 220, a radio frequency (RF) front end 222, and an antenna 224. The resulting signal 226 is then shown being transmitted into a wireless channel h.

The physical layer of an OFDMA system may include several functional stages. The first set of functional stages may be related to forward error correction (FEC). The next set of functional stages may be related to the construction of the OFDM symbol in the frequency domain. During this stage, data may be mapped onto the appropriate subchannels and subcarriers. Pilot symbols may be inserted into the pilot subcarriers, which may allow the receiver to estimate and track the channel status information (CSI). The final set of functions may be related to the conversion of the OFDM symbol from the frequency domain to the time domain and eventually to an analog signal that can be transmitted over the air.

As indicated above, the first set of functional stages may be related to forward error correction (FEC). This may include channel coding, interleaving, and symbol mapping (modulation).

Channel coding may be performed on each FEC block, which may include an integer number of subchannels. A subchannel may be the basic unit of resource allocation in the physical layer of an OFDMA system, and may include several data and pilot subcarriers. The exact number of data and pilot subcarriers in a subchannel may depend on a subcarrier permutation scheme. The maximum number of subchannels in an FEC block may be dependent on the channel coding scheme and the modulation constellation.

After channel coding, the next step may be interleaving. Encoded bits may be interleaved using a two-step process. The first step may ensure that the adjacent coded bits are mapped onto nonadjacent subcarriers, which may provide frequency diversity and therefore may improve the performance of the decoder. The second step may ensure that adjacent bits are alternately mapped to less and more significant bits of the modulation constellation. Interleaving may be performed independently on each FEC block.

During the symbol mapping stage, the sequence of binary bits may be converted to a sequence of complex valued symbols in accordance with a modulation constellation. Examples of modulation constellations that may be used include Quadrature Phase Shift Keying (QPSK), 16 Quadrature Amplitude Modulation (QAM), 64 QAM, etc.

The term "diversity" refers generally to the various methods available for providing the receiver with uncorrelated renditions of the signal of interest. Repetition coding may be used to achieve diversity. This may be referred to herein as "repetition diversity."

With repetition coding, the number of allocated slots ($N_s$) may be a multiple of the repetition factor R for the uplink. For the downlink, the number of allocated slots ($N_s$) may be in the range of [R×K, R×K+(R−1)], where K is the number of required slots before applying the repetition scheme. For example, if K=10 and a repetition factor of R=6 is applied, then the number of allocated slots ($N_s$) may be from 60 slots to 65 slots.

The binary data that fits into a region that is repetition coded may be reduced by a factor R compared to a nonrepeated region of the ($\lfloor N_s/R \rfloor \times R$) slots with the same size and FEC code type. After FEC and bit-interleaving, the data may be segmented into slots, and each group of bits designated to fit in a slot may be repeated R times to form R contiguous slots following the normal slot ordering that may be used for data mapping. The actual constellation data can be different because of subcarrier randomization.

Figure 3:
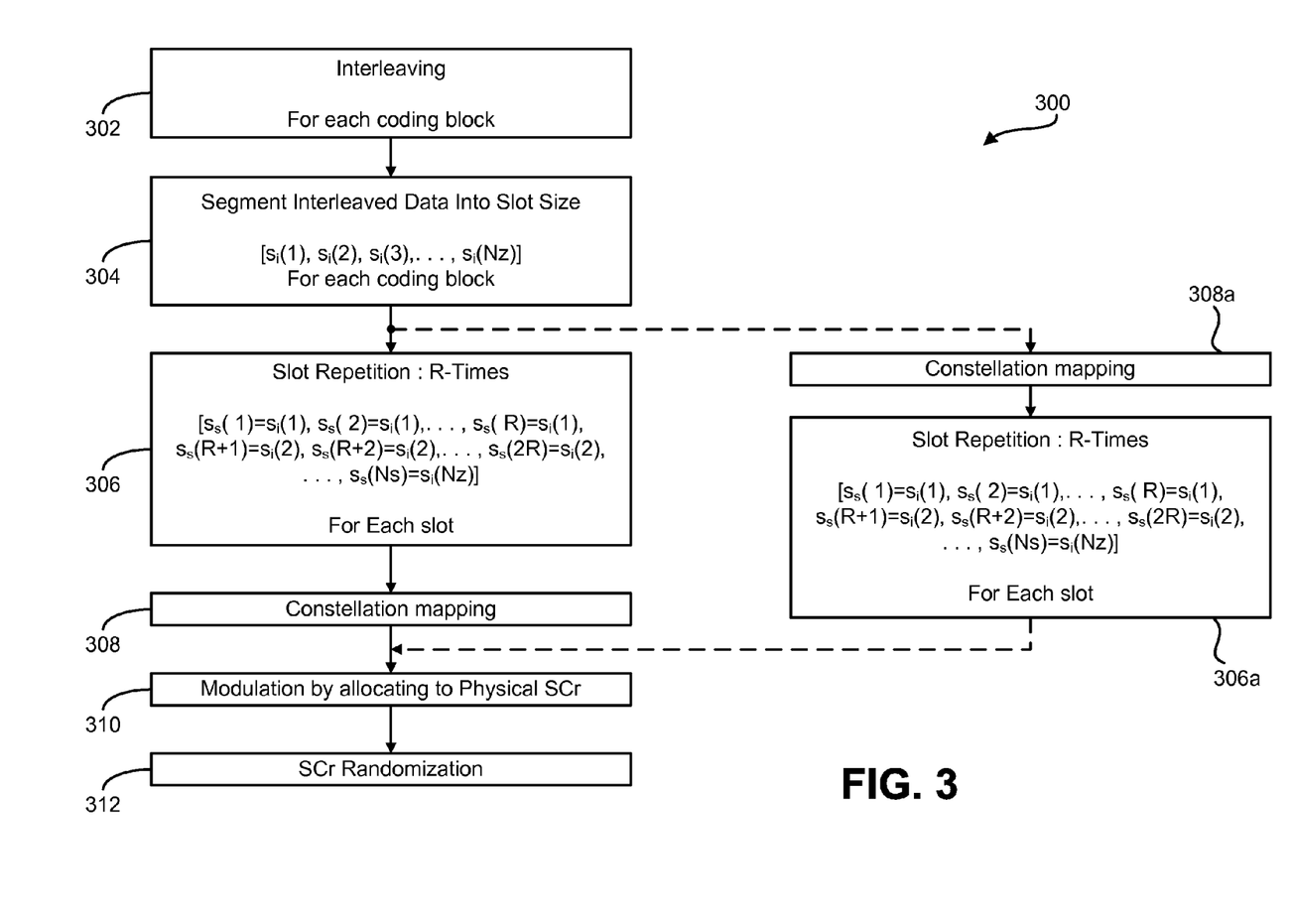
FIG. 3 illustrates an example of a method for slot repetition coding.

FIG. 3 illustrates an example of a method 300 for slot repetition coding. In accordance with the method 300, interleaving 302 may be performed for each coding block. The interleaved data may then be segmented 304 into slots. The slots may be represented as $[s_i(1), s_i(2), s_i(3), \ldots, s_i(N_z)]$, where $s_i(z)$ refers to the interleaved data in the $z^{th}$ slot, and $z=1, 2, \ldots, N_z$.

The term $N_s$ refers to the number of allocated slots including repetition coded data, and the term $N_z$ refers to the number of allocated slots before repetition coding. The relationship between $N_s$ and $N_z$ may be expressed as $N_s = R \times N$ or $$N_z = \frac{N_s}{R},$$

where R is a repetition factor. In IEEE 802.16, R=1, 2, 4, or 6.

Slot repetition 306 may then be performed R times. For example, if R=2, then the original signal and one additional signal that is the same as the original signal may be transmitted, and these signals may be transmitted in different slots.

Following slot repetition, the signal may be represented as:

$$[s_s(1) = s_i(1), s_s(2) = s_i(1), \ldots, s_s(R) = s_i(1), s_s(R+1) = s_i(2), \\ s_s(R+2) = s_i(2), \ldots, s_s(2R) = s_i(2), \ldots, s_s(N_s) = s_i(N_z)] \quad (1)$$

In (1), the term $s_i(\ )$ refers to a slot before repetition 306 is performed, and $s_s(\ )$ refers to a slot after repetition 306 is performed.

Constellation mapping 308 may be performed after slot repetition 306. Alternatively, constellation mapping 308a may be performed prior to slot repetition 306a. Modulation 310 (i.e., mapping the data onto the appropriate subchannels and subcarriers) and subcarrier randomization 312 may then be performed.

Figure 4A:
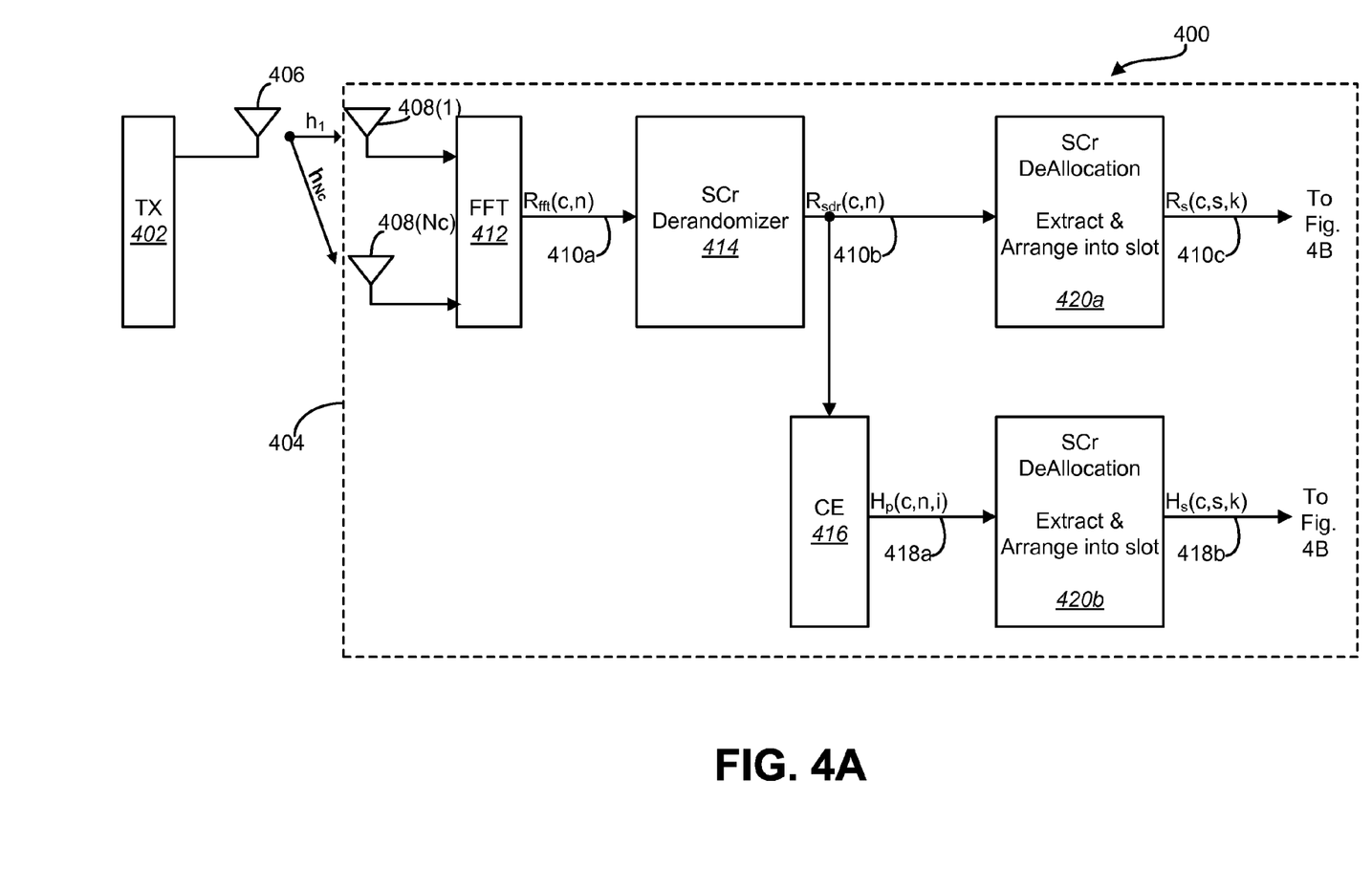
FIGS. 4A and 4B illustrate a system for diversity combining of repeated signals in OFDMA systems.
Figure 4B:
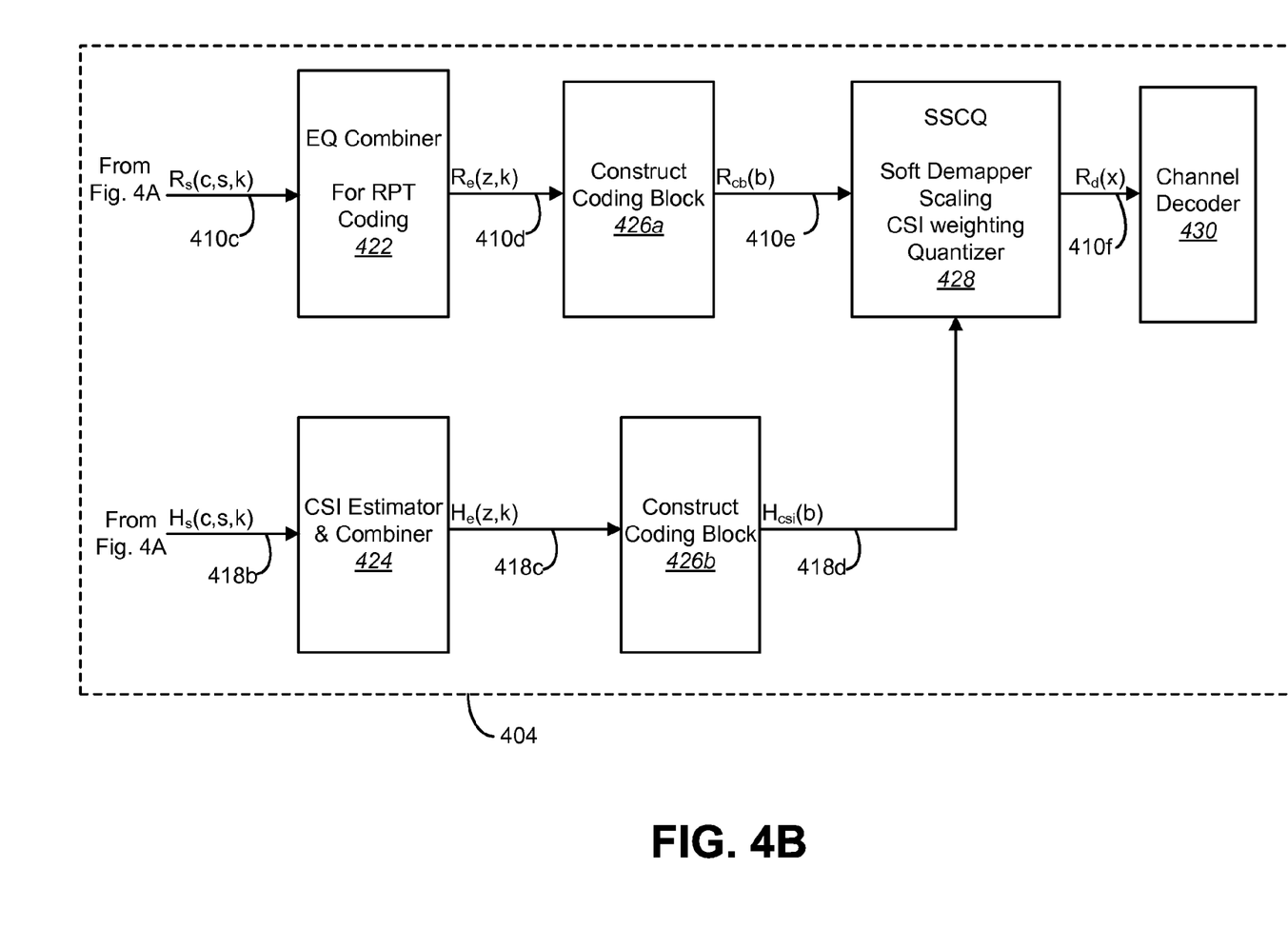

FIGS. 4A and 4B illustrate a system 400 for diversity combining of repeated signals in OFDMA systems. The system 400 includes a transmitter 402 and a receiver 404. The transmitter 402 may be implemented in a base station 104, and the receiver 404 may be implemented in a user terminal 106. Alternatively, the transmitter 402 may be implemented in a user terminal 106, and the receiver 404 may be implemented in a base station 104.

Referring initially to FIG. 4A, the transmitter 402 is shown with an antenna 406, and the receiver 404 is shown with $N_c$ antennas 408(1) ... 408($N_c$). The antennas 408(1) ... 408($N_c$) may be provided for the purpose of achieving receiver antenna diversity. $N_c$ different communication channels $h_1 \ldots h_{N_c}$ may exist between the antenna 406 of the transmitter 402 and the antennas 408(1) ... 408($N_c$) of the receiver 404.

The transmitter 402 may utilize OFDMA techniques in order to transmit signals to the receiver 404. Thus, the signals that are received by the receiver 404 may be referred to as OFDMA signals.

If multiple antennas 408(1) ... 408($N_c$) are used by the receiver 404 (as shown), and if the transmitter 402 performs repetition coding for purposes of repetition diversity, then each of the antennas 408(1) ... 408($N_c$) may receive R repeated OFDMA signals, where R is a repetition factor. In other words, $N_c$ sets of R repeated OFDMA signals may be received by the receiver 404.

The receiver 404 may include a fast Fourier transform (FFT) component 412 that may be configured to perform FFT operations with respect to the OFDMA signals that are received. An $N_{fft}$-point FFT operation may be performed with respect to each communication channel h, resulting in frequency domain OFDMA signals $R_{fft}(c,n)$ 410a. The term c is an index for the communication channel ($c=1, 2, \ldots, N_c$), and the term n is an index for the FFT ($n=1, 2, \ldots, N_{fft}$).

The receiver 404 may also include a subcarrier derandomizer 414 that may be configured to perform subcarrier derandomization with respect to the frequency domain OFDMA signals $R_{fft}(c,n)$ 410a, resulting in derandomized OFDMA signals $R_{sdr}(c,n)$ 410b. Subcarrier derandomization may be performed for all useful sub-carriers.

The receiver 404 may also include a channel estimator 416 that may be configured to use $R_{sdr}(c,n)$ 410b to perform channel estimation, resulting in channel estimates $H_p(c,n,i)$ 418a. The term i is an index for the OFDMA symbol ($i=1, 2, \ldots, N_i$). Channel estimation may be performed for all possible channels, sub-carriers and symbols.

The receiver 404 may also include first and second subcarrier deallocators 420a, 420b. The first subcarrier deallocator 420a may be configured to perform subcarrier deallocation with respect to the derandomized OFDMA signals $R_{sdr}(c,n)$ 410b, resulting in deallocated OFDMA signals $R_s(c,s,k)$ 410c. The term $s=1, 2, \ldots, N_s$, where $k=1, 2, \ldots, N_{sc}$, and where $N_{sc}$ is the number of subcarriers per slot. The second subcarrier deallocator 420b may be configured to perform subcarrier deallocation with respect to the channel estimates $H_p(c,n,i)$ 418a, resulting in deallocated channel estimates $H_s(c,s,k)$ 418b.

Subcarrier deallocation may be performed using the same permutation scheme that was used in the transmitter 402 for purposes of subcarrier allocation. Subcarrier deallocation may involve extracting the corresponding subcarriers and arranging the subcarriers into the slot basis format.

After subcarrier deallocation, repetition diversity equalization and combining and receiver antenna diversity equalization and combining may be performed with respect to the deallocated OFDMA signals $R_s(c,s,k)$ 410c. In particular, the portions of the deallocated OFDMA signals $R_s(c,s,k)$ 410c that correspond to different sources of repetition diversity (i.e., the repeated OFDMA signals) may be equalized and combined. In addition, the portions of the deallocated OFDMA signals $R_s(c,s,k)$ 410c that correspond to different sources of receiver antenna diversity (i.e., the different antennas 408(1) ... 408($N_c$)) may also be equalized and combined.

An equalizer and combiner 422 is shown for performing repetition diversity equalization and combining with respect to the deallocated OFDMA signals $R_s(c,s,k)$ 410c, and also for performing receiver antenna diversity equalization and combining with respect to the deallocated OFDMA signals $R_s(c,s,k)$ 410c. Equalized OFDMA signals $R_e(z,k)$ 410d are shown as the output of the equalizer and combiner 422.

Equalization and combining may be performed in accordance with a maximum ratio combining (MRC) scheme, which may depend on the deallocated channel estimates $H_s(c,s,k)$ 418b. For example, MRC-based equalization and combining may be performed in accordance with equation (2):

$$R_e(z, k) = \frac{\sum_{c=1}^{N_c} \sum_{s=(z-1)R+1}^{(z-1)R+R} R_s(c, s, k) H_s(c, s, k)^*}{\sum_{c=1}^{N_c} \sum_{s=(z-1)R+1}^{(z-1)R+R} |H_s(c, s, k)|^2} \quad (2)$$

Repetition diversity combining and receiver antenna diversity combining may also be performed with respect to the deallocated channel estimates $H_s(c,s,k)$ 418b in order to estimate channel status information (CSI). In particular, the portions of the deallocated channel estimates $H_s(c,s,k)$ 418b that correspond to different sources of repetition diversity (i.e., the repeated OFDMA signals) may be combined. In addition, the portions of the deallocated channel estimates $H_s(c,s,k)$ 418b that correspond to different sources of receiver antenna diversity (i.e., the different antennas 408(1) ... 408($N_c$)) may also be combined.

A CSI estimator and combiner 424 is shown for performing repetition diversity combining with respect to the deallocated channel estimates $H_s(c,s,k)$ 418b, and also for performing receiver antenna diversity combining with respect to the deallocated channel estimates $H_s(c,s,k)$ 418b. CSI estimates $H_e(z, k)$ 418c are shown as the output of the CSI estimator and combiner 424. CSI estimation and combining may be performed in accordance with equation (3):

$$H_e(z, k) = \frac{\sum_{c=1}^{N_c} \sum_{s=(z-1)R+1}^{(z-1)R+R} |H_s(c, s, k)|^2}{N_c \times R} \quad (3)$$

Following equalization and combining and CSI estimation and combining, coding blocks may then be constructed. A first coding block construction component 426a may be configured to construct a data coding block $R_{cb}(b)$ 410e from the equalized OFDMA signals $R_e(z,k)$ 410d. The resulting data coding block $R_{cb}(b)$ 410e may be expressed as:

$$R_{cb}(b) = [R_e(1,k), R_e(2,k), \ldots, R_e(z,k), \ldots, R_e(N_z,k)] \quad (4)$$

In equation (4), $b=1, 2, \ldots, N_b$, where $N_b$ is the number of modulated symbols for the coding block, and $N_b = N_z \times N_{sc}$.

A second coding block construction component 426b may be configured to construct a channel estimate coding block from the CSI estimates $H_e(z,k)$ 418c. The resulting channel estimate coding block $H_{csi}(b)$ 418d may be expressed as:

$$H_{csi}(b) = [H_e(1,k), H_e(2,k), \ldots, H_e(z,k), \ldots, H_e(N_z,k)] \quad (5)$$

The receiver 404 may also include a component 428 that is configured to perform soft demapping, scaling, CSI weighting and quantization. Both $R_{cb}(b)$ 410e and $H_{csi}(b)$ 418d are shown being provided as input to this component 428. The result of the soft demapping, scaling, CSI weighting and quantization is a demapped OFDMA signal $R_d(x)$ 410f, where $x=1, 2, \ldots, N_x$, where $N_x = N_b \times N_{mod}$, and where $N_{mod}$ is the modulation order. The receiver 404 may also include a channel decoder 430 that may be configured to perform channel decoding with respect to the demapped OFDMA signal $R_d(x)$ 410f.

Figure 5A:
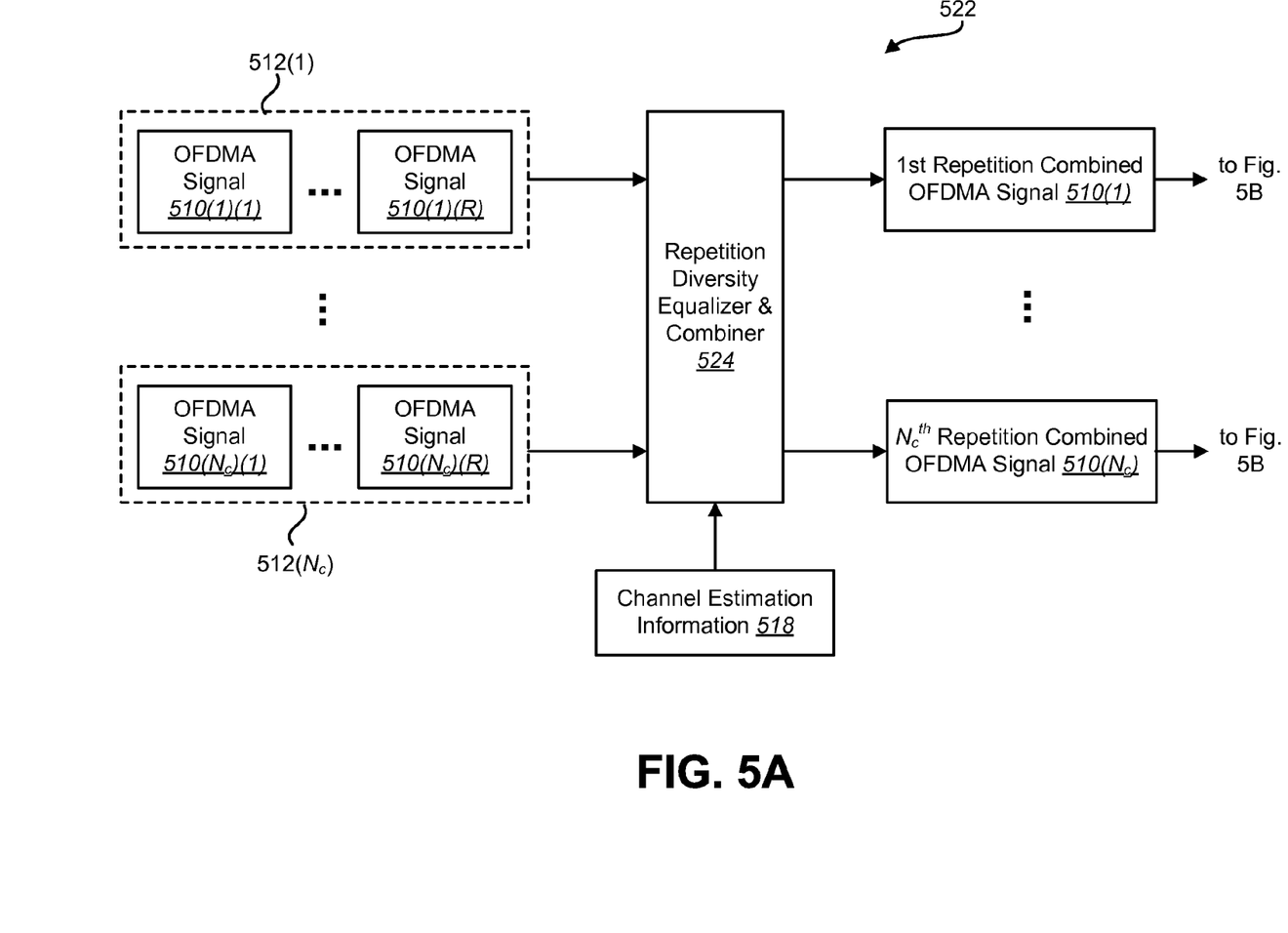
FIGS. 5A and 5B illustrate an example showing how repetition diversity equalization and combining and receiver antenna diversity equalization and combining may be performed.
Figure 5B:
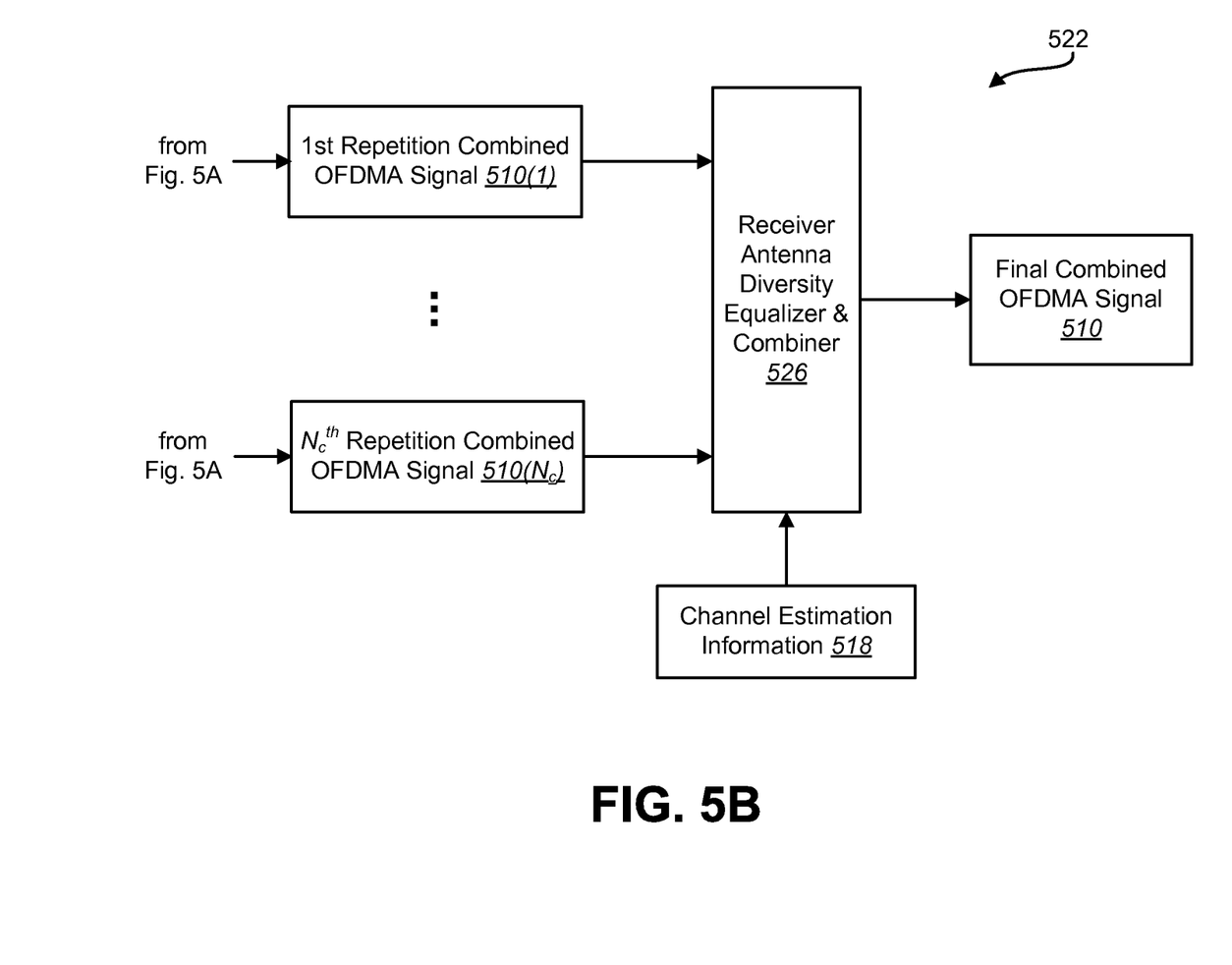

As indicated above, the equalizer and combiner 422 may be configured to combine the portions of $R_s(c,s,k)$ 410c that correspond to different sources of repetition diversity (i.e., repeated OFDMA signals). The equalizer and combiner 422 may also be configured to combine the portions of $R_s(c,s,k)$ 410c that correspond to different receiver antenna diversity sources (i.e., the different antennas 408(1) ... 408($N_c$)). FIGS. 5A and 5B illustrate an example of how the repetition diversity combining and the receiver antenna diversity combining may occur.

Referring initially to FIG. 5A, there is shown a first set 512(1) of repeated OFDMA signals 510(1)(1) ... 510(1)(R) that may be received by the first antenna 408(1) of the receiver 404. FIG. 5A also shows an $N_c^{th}$ set 512($N_c$) of repeated OFDMA signals 510($N_c$)(1) ... 510($N_c$)(R) that may be received by the $N_c^{th}$ antenna 408($N_c$) of the receiver 404.

FIG. 5A also shows a repetition diversity equalizer and combiner 524, which may be part of an equalizer and combiner 522. The repetition diversity equalizer and combiner 524 may be configured to combine the repeated OFDMA signals 510(1)(1) ... 510(1)(R) that are received by the first antenna 408(1), resulting in a first repetition combined OFDMA signal 510(1). The repetition diversity equalizer and combiner 524 may also be configured to combine the repeated OFDMA signals 510($N_c$)(1) ... 510($N_c$)(R) that are received by the $N_c^{th}$ antenna 408($N_c$), resulting in an $N_c^{th}$ repetition combined OFDMA signal 510($N_c$).

The repeated OFDMA signals 510(1)(1) ... 510(1)(R) may be combined in accordance with a maximum ratio combining (MRC) scheme, which may depend on channel estimation information 518. Channel estimation information 518 is shown being provided as input to the repetition diversity combiner 524.

Referring now to FIG. 5B, the equalizer and combiner 522 is shown with a receiver antenna diversity equalizer and combiner 526. The receiver antenna diversity equalizer and combiner 526 may be configured to combine the repetition combined OFDMA signals 510(1) ... 510(N), resulting in a final combined OFDMA signal 510.

The repetition combined OFDMA signals 510(1) ... 510($N_c$) may be combined in accordance with a maximum ratio combining (MRC) scheme, which may depend on channel estimation information 518. Channel estimation information 518 is shown being provided as input to the receiver antenna diversity combiner 526.

In the example of FIGS. 5A and 5B, repetition diversity combining is shown occurring before receiver antenna diversity combining. Alternatively, repetition diversity combining may occur after receiver antenna diversity combining. Alternatively still, repetition diversity combining may occur at substantially the same time as receiver antenna diversity combining.

Figure 6:
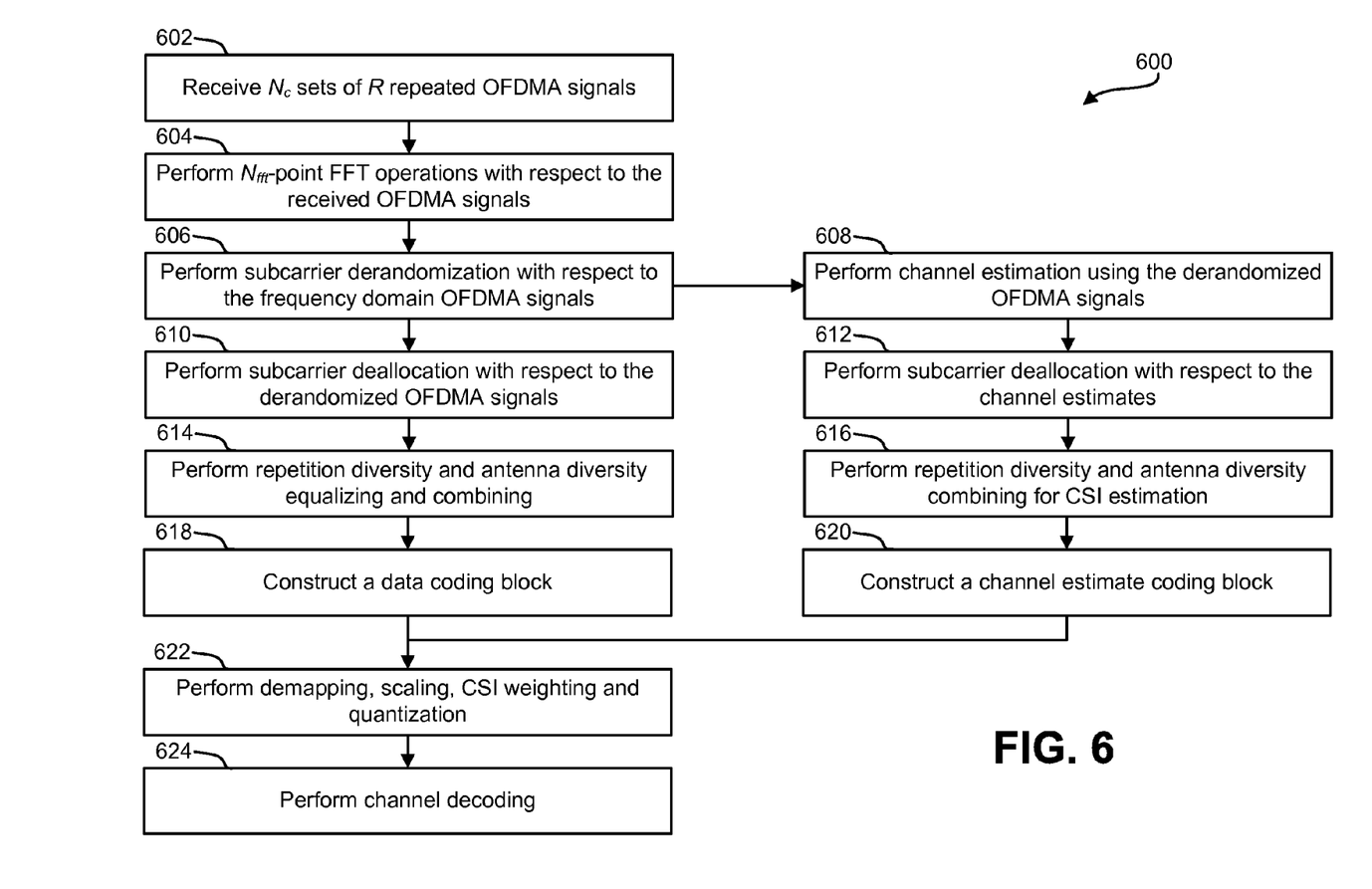
FIG. 6 illustrates a method for diversity combining of repeated signals in OFDMA systems.

FIG. 6 illustrates a method 600 for diversity combining of repeated signals in OFDMA systems. In accordance with the method 600, $N_c$ sets of R repeated OFDMA signals may be received 602.

Fast Fourier transform (FFT) operations may be performed 604 with respect to the received OFDMA signals. In particular, an $N_{fft}$-point FFT operation may be performed with respect to each communication channel h, resulting in frequency domain OFDMA signals $R_{fft}(c,n)$ 410a.

Subcarrier derandomization may then be performed 606 with respect to the frequency domain OFDMA signals $R_{fft}(c, n)$ 410a, resulting in derandomized OFDMA signals $R_{sdr}(c,n)$ 410b. The derandomized OFDMA signals $R_{sdr}(c,n)$ 410b may be used to perform 608 channel estimation, resulting in channel estimates $H_p(c,n,i)$ 418a.

Subcarrier deallocation may be performed 610 with respect to the derandomized OFDMA signals $R_{sdr}(c,n)$ 410b, resulting in deallocated OFDMA signals $R_s(c,s,k)$ 410c. Subcarrier deallocation may also be performed 612 with respect to the channel estimates $H_p(c,n,i)$ 418a, resulting in deallocated channel estimates $H_s(c,s,k)$ 418b.

After subcarrier deallocation, repetition diversity equalization and combining and receiver antenna diversity equalization and combining may be performed 614 with respect to the deallocated OFDMA signals $R_s(c,s,k)$ 410c. In particular, the portions of the deallocated OFDMA signals $R_s(c,s,k)$ 410c that correspond to different sources of repetition diversity (i.e., the repeated OFDMA signals) may be equalized and combined. In addition, the portions of the deallocated OFDMA signals $R_s(c,s,k)$ 410c that correspond to different sources of receiver antenna diversity (i.e., the different antennas 408(1) ... 408($N_c$)) may also be equalized and combined. Equalization and combining for both repetition diversity and receiver antenna diversity may be performed in accordance with a maximum ratio combining (MRC) scheme, which may depend on the deallocated channel estimates $H_s(c,s,k)$ 418b. For example, MRC-based equalization and combining may be performed in accordance with equation (2) above.

Repetition diversity combining and receiver antenna diversity combining may also be performed with respect to the deallocated channel estimates $H_s(c,s,k)$ 418b in order to estimate 616 channel status information (CSI). In particular, the portions of the deallocated channel estimates $H_s(c,s,k)$ 418b that correspond to different sources of repetition diversity (i.e., the repeated OFDMA signals) may be combined. In addition, the portions of the deallocated channel estimates $H_s(c,s,k)$ 418b that correspond to different sources of receiver antenna diversity (i.e., the different antennas 408(1) ... 408($N_c$)) may also be combined.

A data coding block $R_{cb}(b)$ 410e may be constructed 618 from the equalized OFDMA signals $R_e(z,k)$ 410d. A channel estimate coding block $H_{csi}(b)$ 418d may be constructed 620 from the CSI estimates $H_e(z,k)$ 418c. Soft demapping, scaling, CSI weighting and quantization may then be performed 622, resulting in a demapped OFDMA signal $R_d(x)$ 410f. Channel decoding 624 may then be performed with respect to the demapped OFDMA signal $R_d(x)$ 410f.

Figure 7:
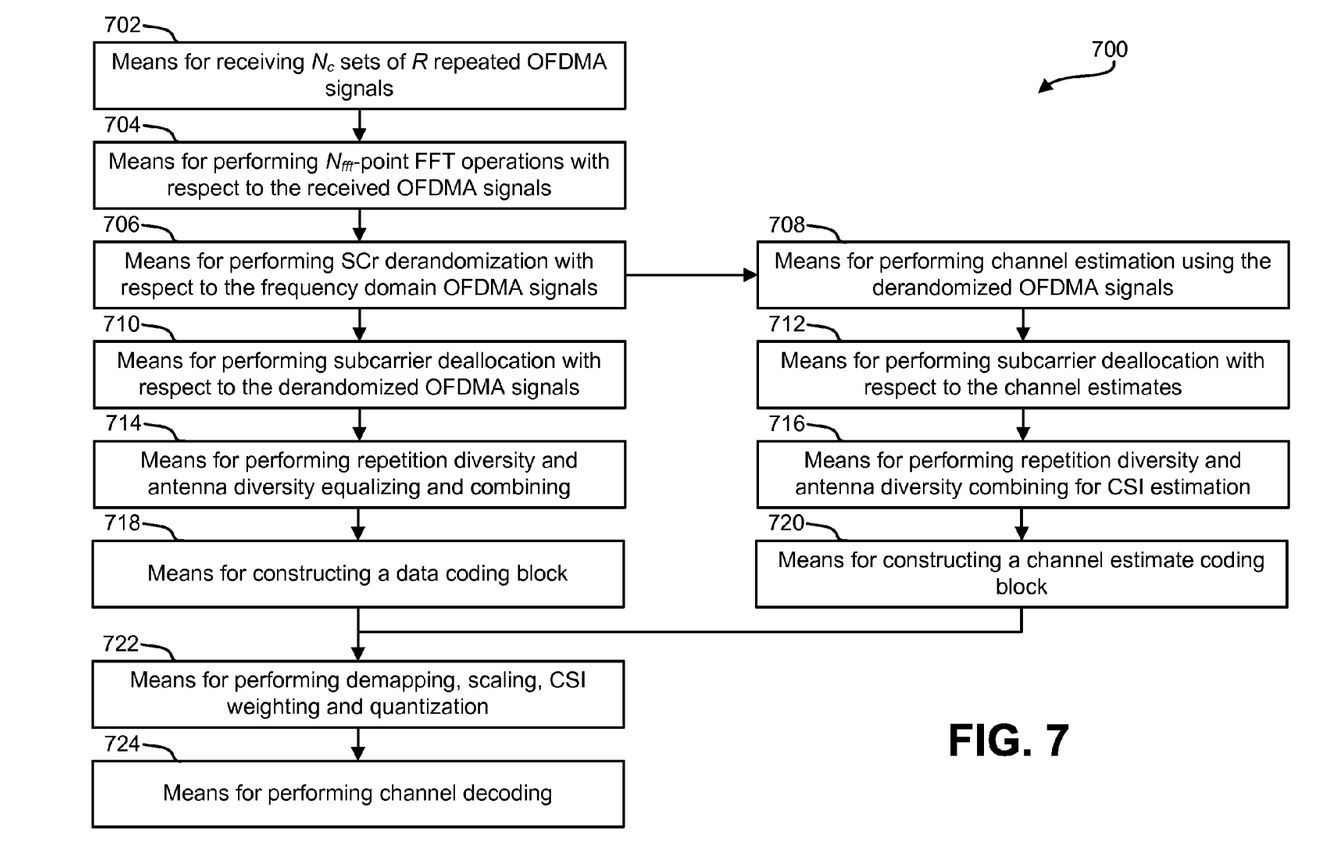
FIG. 7 illustrates means-plus-function blocks corresponding to the method shown in FIG. 6.

The method 600 of FIG. 6 described above may be performed by various hardware and/or software component(s) and/or module(s) corresponding to the means-plus-function blocks 700 illustrated in FIG. 7. In other words, blocks 602 through 624 illustrated in FIG. 6 correspond to means-plus-function blocks 702 through 724 illustrated in FIG. 7.

Figure 8:
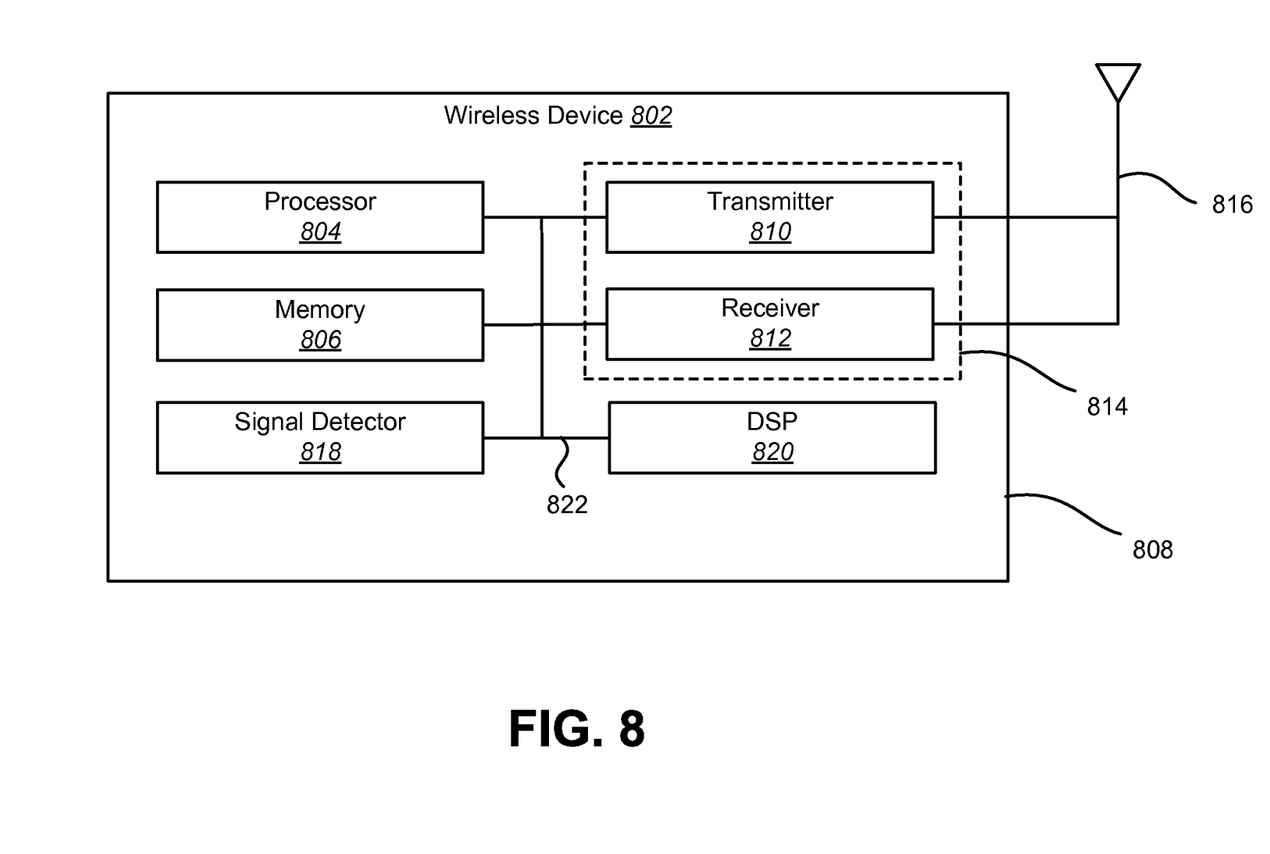
FIG. 8 illustrates various components that may be utilized in a wireless device.

FIG. 8 illustrates various components that may be utilized in a wireless device 802. The wireless device 802 is an example of a device that may be configured to implement the various methods described herein. The wireless device 802 may be a base station 104 or a remote station 106.

The wireless device 802 may include a processor 804 which controls operation of the wireless device 802. The processor 804 may also be referred to as a central processing unit (CPU). Memory 806, which may include both read-only memory (ROM) and random access memory (RAM), provides instructions and data to the processor 804. A portion of the memory 806 may also include non-volatile random access memory (NVRAM). The processor 804 typically performs logical and arithmetic operations based on program instructions stored within the memory 806. The instructions in the memory 806 may be executable to implement the methods described herein.

The wireless device 802 may also include a housing 808 that may include a transmitter 810 and a receiver 812 to allow transmission and reception of data between the wireless device 802 and a remote location. The transmitter 810 and receiver 812 may be combined into a transceiver 814. An antenna 816 may be attached to the housing 808 and electrically coupled to the transceiver 814. The wireless device 802 may also include (not shown) multiple transmitters, multiple receivers, multiple transceivers and/or multiple antenna.

The wireless device 802 may also include a signal detector 818 that may be used to detect and quantify the level of signals received by the transceiver 814. The signal detector 818 may detect such signals as total energy, pilot energy per pseudonoise (PN) chips, power spectral density, and other signals. The wireless device 802 may also include a digital signal processor (DSP) 820 for use in processing signals.

The various components of the wireless device 802 may be coupled together by a bus system 822 which may include a power bus, a control signal bus, and a status signal bus in addition to a data bus. However, for the sake of clarity, the various busses are illustrated in FIG. 8 as the bus system 822.

As used herein, the term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core or any other such configuration.

The steps of a method or algorithm described in connection with the present disclosure may be embodied directly in hardware, in a software module executed by a processor or in a combination of the two. A software module may reside in any form of storage medium that is known in the art. Some examples of storage media that may be used include RAM memory, flash memory, ROM memory, EPROM memory, EEPROM memory, registers, a hard disk, a removable disk, a CD-ROM and so forth. A software module may comprise a single instruction, or many instructions, and may be distributed over several different code segments, among different programs and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored as one or more instructions on a computer-readable medium. A computer-readable medium may be any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein, such as those illustrated by FIGS. 6-7, can be downloaded and/or otherwise obtained by a mobile device and/or base station as applicable. For example, such a device can be coupled to a server to facilitate the transfer of means for performing the methods described herein. Alternatively, various methods described herein can be provided via a storage means (e.g., random access memory (RAM), read only memory (ROM), a physical storage medium such as a compact disc (CD) or floppy disk, etc.), such that a mobile device and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for diversity combining in an orthogonal frequency division multiple access (OFDMA) system, comprising:

performing repetition diversity equalization and combining with respect to received OFDMA signals; and performing receiver antenna diversity equalization and combining with respect to the received OFDMA signals, wherein the repetition diversity equalization and combining and the receiver antenna diversity equalization and combining are performed in accordance with a maximum ratio combining (MRC) scheme, and wherein the repetition diversity equalization and combining and the receiver antenna diversity equalization and combining are performed as $$R_e(z,k) = \frac{\sum_{c=1}^{N_c}\sum_{s=(z-1)R+1}^{(z-1)R+R} R_s(c,s,k)H_s(c,s,k)^*}{\sum_{c=1}^{N_c}\sum_{s=(z-1)R+1}^{(z-1)R+R} |H_s(c,s,k)|^2},$$

wherein $R_s(\ )$ indicates the received OFDMA signals, wherein $H_s(\ )$ indicates channel estimates, wherein c is a communication channel index, wherein z is a slot index prior to repetition coding, wherein s is a slot index after repetition coding, and wherein k is a subcarrier index.

2. The method of claim 1, wherein the repetition diversity equalization and combining comprises equalizing and combining repeated signals within the received OFDMA signals.

3. The method of claim 1, wherein the receiver antenna diversity equalization and combining comprises equalizing and combining portions of the received OFDMA signals that correspond to different receiver antennas.

4. The method of claim 1, further comprising performing channel estimation, wherein the MRC scheme for the repetition diversity equalization and combining and the receiver antenna diversity equalization and combining depends on channel estimation information that is obtained from the channel estimation.

5. The method of claim 1, wherein the repetition diversity combining of channel estimates comprises combining portions of the channel estimates that correspond to repeated signals within the received OFDMA signals.

6. The method of claim 1, wherein the receiver antenna diversity combining of channel estimates comprises combining portions of the channel estimates that correspond to different receiver antennas.

7. A wireless device for diversity combining in an orthogonal frequency division multiple access (OFDMA) system, comprising:

a repetition diversity equalizer and combiner that is configured to perform repetition diversity equalization and combining with respect to received OFDMA signals;

a receiver antenna diversity equalizer and combiner that is configured to perform receiver antenna diversity equalization and combining with respect to the received OFDMA signals; and a channel status information (CSI) estimator and combiner that is configured to perform repetition diversity combining and receiver antenna diversity combining with respect to channel estimates for purposes of CSI estimation, wherein the repetition diversity equalization and combining and the receiver antenna diversity equalization and combining are performed in accordance with a maximum ratio combining (MRC) scheme, and wherein the repetition diversity equalization and combining and the receiver antenna diversity equalization and combining are performed as $$R_e(z,k) = \frac{\sum_{c=1}^{N_c}\sum_{s=(z-1)R+1}^{(z-1)R+R} R_s(c,s,k)H_s(c,s,k)^*}{\sum_{c=1}^{N_c}\sum_{s=(z-1)R+1}^{(z-1)R+R} |H_s(c,s,k)|^2},$$

wherein $R_s(\ )$ indicates the received OFDMA signals, wherein $H_s(\ )$ indicates channel estimates, wherein c is a communication channel index, wherein z is a slot index prior to repetition coding, wherein s is a slot index after repetition coding, and wherein k is a subcarrier index.

8. The wireless device of claim 7, wherein the repetition diversity equalization and combining comprises equalizing and combining repeated signals within the received OFDMA signals.

9. The wireless device of claim 7, wherein the receiver antenna diversity equalization and combining comprises equalizing and combining portions of the received OFDMA signals that correspond to different receiver antennas.

10. The wireless device of claim 7, further comprising a channel estimator that is configured to perform channel estimation,
wherein the MRC scheme for the repetition diversity equalization and combining and the receiver antenna diversity equalization and combining depends on channel estimation information that is obtained from the channel estimation.

11. The wireless device of claim 7, wherein the repetition diversity combining for CSI estimation comprises combining portions of the channel estimates that correspond to repeated signals within the received OFDMA signals.

12. The wireless device of claim 7, wherein the receiver antenna diversity combining for CSI estimation comprises combining portions of the channel estimates that correspond to different receiver antennas.

13. An apparatus for diversity combining in an orthogonal frequency division multiple access (OFDMA) system, comprising:
means for performing repetition diversity equalization and combining with respect to received OFDMA signals; and
means for performing receiver antenna diversity equalization and combining with respect to the received OFDMA signals,
wherein the repetition diversity equalization and combining and the receiver antenna diversity equalization and combining are performed in accordance with a maximum ratio combining (MRC) scheme, and
wherein the repetition diversity equalization and combining and the receiver antenna diversity equalization and combining are performed as $$R_e(z, k) = \frac{\sum_{c=1}^{N_C} \sum_{s=(z-1)R+1}^{(z-1)R+R} R_s(c, s, k) H_s(c, s, k)^*}{\sum_{c=1}^{N_C} \sum_{s=(z-1)R+1}^{(z-1)R+R} |H_s(c, s, k)|^2},$$

wherein $R_s( \ )$ indicates the received OFDMA signals, wherein $H_s( \ )$ indicates channel estimates, wherein c is a communication channel index, wherein z is a slot index prior to repetition coding, wherein s is a slot index after repetition coding, and wherein k is a subcarrier index.

14. The apparatus of claim 13, wherein the means for repetition diversity equalization and combining comprises means for equalizing and combining repeated signals within the received OFDMA signals.

15. The apparatus of claim 13, wherein the means for receiver antenna diversity equalization and combining comprises means for equalizing and combining portions of the received OFDMA signals that correspond to different receiver antennas.

16. The apparatus of claim 13, further comprising means for performing channel estimation, wherein the MRC scheme for the repetition diversity equalization and combining and the receiver antenna diversity equalization and combining depends on channel estimation information that is obtained from the channel estimation.

17. The apparatus of claim 13, wherein the means for repetition diversity combining of channel estimates comprises means for combining portions of the channel estimates that correspond to repeated signals within the received OFDMA signals.

18. The apparatus of claim 13, wherein the means for receiver antenna diversity combining of channel estimates comprises means for combining portions of the channel estimates that correspond to different receiver antennas.

19. A computer-program product for diversity combining in an orthogonal frequency division multiple access (OFDMA) system, the computer-program product comprising a non-transitory computer-readable medium comprising code for:
performing repetition diversity equalization and combining with respect to received OFDMA signals;
performing receiver antenna diversity equalization and combining with respect to the received OFDMA signals; and
performing repetition diversity combining and receiver antenna diversity combining of channel estimates for purposes of channel status information (CSI) estimation,
wherein the repetition diversity equalization and combining and the receiver antenna diversity equalization and combining are performed in accordance with a maximum ratio combining (MRC) scheme, and
wherein the repetition diversity equalization and combining and the receiver antenna diversity equalization and combining are performed as $$R_e(z, k) = \frac{\sum_{c=1}^{N_C} \sum_{s=(z-1)R+1}^{(z-1)R+R} R_s(c, s, k) H_s(c, s, k)^*}{\sum_{c=1}^{N_C} \sum_{s=(z-1)R+1}^{(z-1)R+R} |H_s(c, s, k)|^2},$$

wherein $R_s( \ )$ indicates the received OFDMA signals, wherein $H_s( \ )$ indicates channel estimates, wherein c is a communication channel index, wherein z is a slot index prior to repetition coding, wherein s is a slot index after repetition coding, and wherein k is a subcarrier index.

20. The computer-program product of claim 19, wherein the code for repetition diversity equalization and combining comprises code for equalizing and combining repeated signals within the received OFDMA signals.

21. The computer-program product of claim 19, wherein the code for receiver antenna diversity equalization and combining comprises code for equalizing and combining portions of the received OFDMA signals that correspond to different receiver antennas.

22. The computer-program product of claim 19, further comprising code for performing channel estimation, wherein the MRC scheme for the repetition diversity equalization and combining and the receiver antenna diversity equalization and combining depends on channel estimation information that is obtained from the channel estimation.

23. The computer-program product of claim 19, wherein the code for repetition diversity combining for channel estimates comprises code for combining portions of the channel estimates that correspond to repeated signals within the received OFDMA signals.

24. The computer-program product of claim 19, wherein the code for receiver antenna diversity combining for channel estimates comprises code for combining portions of the channel estimates that correspond to different receiver antennas.

* * * * *